United States Patent
Cook et al.

(10) Patent No.: US 8,958,308 B2
(45) Date of Patent: Feb. 17, 2015

(54) DATA COMMUNICATION

(75) Inventors: John Wolsey Cook, London (GB); Philip Anthony Everett, London (GB); Christopher Marcus Croot, London (GB); Ashley Pickering, London (GB)

(73) Assignee: British Telecommunications Public Limited Company, London (GB)

( * ) Notice: Subject to any disclaimer, the term of this patent is extended or adjusted under 35 U.S.C. 154(b) by 208 days.

(21) Appl. No.: 13/876,995

(22) PCT Filed: Sep. 30, 2011

(86) PCT No.: PCT/GB2011/001437
§ 371 (c)(1),
(2), (4) Date: Mar. 29, 2013

(87) PCT Pub. No.: WO2012/042231
PCT Pub. Date: Apr. 5, 2012

(65) Prior Publication Data
US 2013/0201836 A1 Aug. 8, 2013

(30) Foreign Application Priority Data
Sep. 30, 2010 (GB) .................................... 10251707

(51) Int. Cl.
*H04L 12/24* (2006.01)
*H04L 12/28* (2006.01)
(Continued)

(52) U.S. Cl.
CPC ........ *H04L 41/0836* (2013.01); *H04L 12/2869* (2013.01); *H04L 43/0847* (2013.01);
(Continued)

(58) Field of Classification Search
CPC . H04M 3/304; H04M 3/2227; H04M 11/062; H04M 2201/18; H04B 3/46
USPC ................ 370/241, 252, 255, 352, 338, 464; 375/222; 709/224
See application file for complete search history.

(56) References Cited

U.S. PATENT DOCUMENTS

| | | | |
|---|---|---|---|
| 7,684,325 B2* | 3/2010 | Defoort et al. | 370/230 |
| 2003/0005112 A1* | 1/2003 | Krautkremer | 709/224 |

(Continued)

OTHER PUBLICATIONS

International Search Report for PCT/GB2011/001437 mailed Jan. 16, 2012.
(Continued)

*Primary Examiner* — Afsar M Qureshi
(74) *Attorney, Agent, or Firm* — Nixon & Vanderhye PC (57) ABSTRACT

A method of operating an access network including a plurality of data connections (19) between end-user devices (12, 14, 16, 18) and an aggregation transceiver device (20) at which the connections (19) are aggregated for onward connection through the access network, the method comprising storing a plurality of different profiles, each profile specifying values for parameters associated with each connection (19); and, for each connection, obtaining connection data relating to a monitoring period, said monitoring period comprising a plurality of shorter periods, said connection data comprising, for each of said shorter periods, an indication of whether said connection has experienced instability during said shorter period, and an indication of user activity on said connection during said shorter period; monitoring the performance of the connection in dependence on said connection data; selecting one of said stored profiles to be applied to the connection in dependence on the results of said monitoring; and applying the selected profile to the connection.

15 Claims, 4 Drawing Sheets

(51) Int. Cl.
*H04M 3/22* (2006.01)
*H04M 3/30* (2006.01)
*H04M 11/06* (2006.01)
*H04L 12/26* (2006.01)

(52) U.S. Cl.
CPC ............ *H04M3/2227* (2013.01); *H04M 3/304* (2013.01); *H04M 11/062* (2013.01); *H04M 2201/18* (2013.01)
USPC ........... 370/241; 370/252; 370/338; 370/352; 375/222; 709/224

(56) References Cited

U.S. PATENT DOCUMENTS

| | | | |
|---|---|---|---|
| 2005/0262237 A1 | 11/2005 | Fulton et al. | |
| 2008/0205263 A1 | 8/2008 | Cooley et al. | |
| 2010/0034216 A1* | 2/2010 | Pickering et al. | 370/464 |
| 2010/0188993 A1* | 7/2010 | Raleigh | 370/252 |
| 2010/0290362 A1* | 11/2010 | Croot et al. | 370/252 |
| 2010/0293274 A1* | 11/2010 | Everett et al. | 709/224 |
| 2011/0010444 A1* | 1/2011 | Everett et al. | 709/223 |
| 2011/0019575 A1* | 1/2011 | Croot et al. | 370/252 |
| 2011/0274009 A1* | 11/2011 | Cooper | 370/255 |
| 2011/0274101 A1* | 11/2011 | Cooper | 370/338 |
| 2013/0028392 A1* | 1/2013 | Croot et al. | 379/1.03 |

OTHER PUBLICATIONS

Search Report for EP 10251707 dated Jan. 14, 2011.
Written Opinion of the International Searching Authority mailed Jan. 16, 2012.

* cited by examiner

Figure 4: Table 1

| Stability | Metric | Very Poor | Poor | OK | Good |
|---|---|---|---|---|---|
| Aggressive | Re-Trains | >10 per hour | mtb<3600 | mtb<8640 | mtb≥8640 |
| Aggressive | Errors | - | mtb<10 | mtb<8640 | mtb≥8640 |
| Normal | Re-Trains | >10 per hour | mtb<7200 | mtb<8640 | mtb≥8640 |
| Normal | Errors | - | mtb<300 | mtb<8640 | mtb≥8640 |
| Stable | Re-Trains | > 10 per hour | mtb<28800 | mtb<86400 | mtb≥86400 |
| Stable | Errors | - | mtb<1000 | mtb<28800 | mtb≥28800 |

Figure 5: Table 2

DATA COMMUNICATION

This application is the U.S. national phase of International Application No. PCT/GB2011/001437 filed 30 Sep. 2011 which designated the U.S. and claims priority to EP 10251707.5 filed 30 Sep. 2010, the entire contents of each of which are hereby incorporated by reference.

FIELD OF THE INVENTION

The present invention relates to data communication. In particular, it relates to the management of an access network including Digital Subscriber Line (DSL) connections.

BACKGROUND TO THE INVENTION

Dynamic Line Management (DLM) is a technique for improving the stability of DSL connections. (NB The term "xDSL" is sometimes used to refer to any of an increasing family of DSL technologies, but the term "DSL" will in general be used here). DLM is particularly useful when operating DSL connections at close to their maximum speed, because under these conditions external noise affecting the transmitted signal can cause the transceivers to be unable to successfully recover the signal to be transmitted with sufficient reliability to enable the connection to be maintained. If this occurs, the connection needs to be re-established. This is referred to as a re-synch or a re-train and the user notices a temporary loss of service while the connection is re-established. Re-synchs are generally found to be particularly annoying by end-users.

DLM seeks to minimise re-synchs by automatically analysing DSL connections (especially the rate of occurrence of re-synchs) and varying certain parameters which can affect the likelihood of re-synchs occurring (for example the depth of interleaving, the amount of redundancy built into the encoding used, etc.). Typically, this is done by using a number of different "profiles" having various different sets of values for the parameters most likely to have an impact on the stability or otherwise of DSL connections and moving a particular connection between different profiles until a profile is found which provides an acceptable stability. The profiles are applied at the local exchange (sometimes referred to—especially in the USA—as the Central Office) usually within a piece of equipment known as a Digital Subscriber Line Access Multiplexer (DSLAM) which houses a number of DSL transceiver units as is well known in the art.

Typically, the profiles are conceptually able to be thought of as ranging between "more aggressive" and "less aggressive", where the more aggressive profiles tend to provide better services to the user in terms of especially higher bit rates and lower latencies, but are more likely to result in the line being unstable, whereas less aggressive profiles tend to offer lower bit rates and/or latencies but greater stabilities.

An Alcatel Technology White Paper from April 2005 entitled "Dynamic Line Management for Digital Subscriber Lines" previously available at the following URL: http://www1.alcatel-lucent.com/com/en/appcontent/apl/18812 DLM twp tcm172-228691635.pdf discusses DLM and suggests in overview an implementation in which there is a "Validation" phase and an "Operations" phase. In the Validation phase a connection is monitored fairly intensively to identify an appropriate profile for the line and thereafter it is monitored less intensively to ensure that the originally selected profile continues to remain valid.

International patent application WO2008/093045 describes an earlier DLM solution devised by the present applicants in which very unstable data connections are detected in an efficient manner and corrective action is taken within a relatively short period of time whilst data connections which are not very unstable are monitored and transitioned between different profiles based on more thorough monitoring over a longer time-scale.

DLM solutions such as those above use, as at least one of the metrics used in monitoring the performance of a line, the number of re-trains or re-synchs occurring on a line within a predetermined period of time. In view of the fact that this metric can in certain circumstances be misleading, International patent application WO2009/081131 proposed a technique intended to allow for a more reliable metric of line performance to be provided. The technique disclosed involves processing data on the number of re-trains or re-synchs occurring on a line within a predetermined period of time in order to take account of the possibility that some re-synchs may be caused (i.e. intentionally) by user action rather than as a result of the line experiencing technical problems or instability.

Referring briefly to other prior patent documents, US 2003/0005112 discloses techniques for enabling a network services provider to deliver application performance management services to its enterprise customers.

US 2008/0205263 relates to techniques for advanced failover packet label swapping for a packet network having a working path and a protection path Finally, US 2005/0262237 relates to dynamic incident tracking and investigation in service monitors, and in particular to a method for monitoring application network transactions and behaviours for a computing environment.

SUMMARY OF THE INVENTION

The present inventors have realised that customers or other end-users may in general not even be aware of, let alone be concerned with temporary periods of instability that occur at times when they are not actively using their networked equipment, and thus that changing the current profile due to such periods of instability that have occurred or frequently occur at such "inactive" times may not be necessary or appropriate. For example, a customer's network connection may be subject to regular maintenance at times in the middle of the night, which may cause network problems, possibly necessitating re-trains and/or re-synchs and/or causing errors in data being sent across the connection (such as dummy packets which may regularly be sent across the connection even when the customer is not actively using their networked equipment), but changing the current profile (e.g. to a less-aggressive/lower bit-rate profile) on account of indications of such problems having occurred during such periods may not actually lead to a "better" overall customer experience as the customer, on account of generally not making active use of any of their networked equipment at those times, may well not have noticed any affects caused by those problems. In fact, changing the current profile on account of such problems having occurred during such periods may even lead to a "worse" overall customer experience if the customer is subsequently assigned a less-aggressive/lower bit-rate profile as a result.

According to a first aspect of the invention, there is provided a method of operating an access network including a plurality of data connections between end-user devices and an aggregation transceiver device at which the data connections are aggregated for onward connection through the access network, the method comprising:
storing a plurality of different profiles, each profile specifying a set of values for one or more parameters associated with each data connection; and, for each data connection;
obtaining connection data relating to a monitoring period, said monitoring period comprising a plurality of shorter periods, said connection data comprising, for each of said shorter periods, a first indication indicative of whether or not said data connection has experienced instability during said shorter period, and a second indication indicative of a measure of user activity on said data connection during said shorter period;
monitoring the performance of the data connection in dependence on said connection data;
selecting one of said stored profiles to be applied to the data connection in dependence on the results of said monitoring; and
applying the selected profile to the data connection;
wherein monitoring the performance of the data connection includes identifying, from the shorter periods within said monitoring period, those shorter periods in respect of which the second indication is indicative of user activity above a predetermined level having been observed on said data connection during said shorter period, and determining or estimating, from first indications obtained in respect of those shorter periods so-identified, a measure of the number of times that the data connection has experienced instability during those shorter periods so-identified within said monitoring period, discounting first indications obtained in respect of shorter periods in respect of which the second indications are indicative of user activity above said predetermined level not having been observed, when selecting a profile to apply to the data connection.

In accordance with the above set out first aspect, metrics relating to periods of instability occurring during a particular monitoring period may be modified to discount indications relating to periods of instability that occurred during any periods in respect of which it is determined that an end-user was not making active use of the connection (i.e. via any of their networked end-user devices). Such a modification may allow a more useful metric to be provided for use in performing Dynamic Line Management.

According to preferred embodiments, first indications in respect of a particular data connection and a particular shorter period may comprise indications of whether or not the data connection has re-synchronised at all during the shorter period and/or of the number of times the data connection has re-synchronised during the shorter period.

Alternatively or additionally, first indications in respect of a particular data connection and a particular shorter period may comprise indications of whether or not errors have occurred at all in data traversing the data connection during the shorter period and/or of the number of errors that have occurred in data traversing the data connection during the shorter period.

Second indications in respect of a particular data connection and a particular shorter period may comprise indications of a measure of the amount of user data flowing on the data connection from and/or towards one or more end-user devices during the shorter period. Measures of the amount of user data flowing on the data connection may take into account the possibility that even when a user is not actively using their networked equipment, other data such as "dummy packets" may regularly be sent across the connection—such other data may be recognised as non-user data, and processing may be used to take account of this and prevent such data from influencing whether shorter periods are identified as being periods with or without (appreciable) user activity, while still allowing errors in such other data to be taken into account in determinations of whether the connection is experiencing periods of instability.

In a preferred embodiment in which a particular data connection is operable to transition between different power modes including at least a normal mode and a low-power mode, the second indication may be an indication of the power mode of the connection, and may in particular be an indication of whether or not the connection operated in a low-power mode in respect of at least a part of a particular shorter period to which the second indication relates, and determining a measure of instability may involve discounting first indications obtained in respect of shorter periods in respect of which the second indications are indicative of the connection having operated in a low-power mode in that shorter period, when selecting a profile to apply to the data connection. This represents a good indication of low levels of user activity during a particular shorter period since the connection is generally configured to enter a low-power mode only during times of low user activity.

Monitoring the performance of the data connection may include identifying, from the shorter periods within the monitoring period, those shorter periods in respect of which the second indication is indicative of any user activity at all having been observed on the data connection during the shorter period.

In preferred embodiments, information is received relating to each 15-minute period (bin) within a 24-hour monitoring period (i.e. ninety-six 15-minute "bins"). Using user-activity indications in that information, a determination is made as to whether the user was active or inactive (i.e. with respect to the network connection) during each of those shorter 15-minute periods. Information relating to instability issues during "active" periods is then taken account of during subsequent decision-making regarding the possible selection of a different profile to be applied to the connection. Information relating to instability issues during "inactive" periods is essentially "filtered out", in order to prevent it from (unduly) influencing any such decision-making. Decision-making may be on the basis of the number of instability issues found to have occurred during the "active bins" within the monitoring period (i.e. taking account of the fact that there may be more than one instability issue during an individual active bin). Alternatively, decision-making may be on the basis of the number of active bins during which at least one, or at least a threshold number of instability issues are found to have occurred. The decision-making may be performed in other manners.

Naturally, in alternative embodiments, different periods of time may be used for the "bins" or for the monitoring periods (e.g. 5, 10 or 30 minute "bins", 12 or 48 hour monitoring periods, etc.).

Preferably two main parameters which control the operation of xDSL connections are varied to generate different profiles, namely the Signal-to-Noise Ratio (SNR) margin (or "target margin") and the fast/interleave mode (or "interleave depth").

The SNR margin represents the amount of redundancy built into the selected bit rate (and other connection options) for the connection, given the measured value of the actual SNR experienced by the modem. Thus, each possible set of significant values for the connection parameters (i.e. bit-rate, level of trellis coding, level of interleave, etc.) has a corresponding baseline SNR which represents the minimum value of the SNR at which the connection would be expected to operate with a Bit Error Rate (BER) of $10^{-7}$ (i.e. 1 bit is expected to be in error for every $10^7$ bits); this BER of $10^{-7}$ is called the target rate as the connection is expected to operate very well with this level of BER. The SNR margin represents the amount (in decibels) by which the actual measured SNR exceeds this baseline amount at the time of setting up the connection. Thus the actual received SNR may vary over time, after setting up the connection, below the measured amount at setting up the connection by up to the amount of the margin and still the connection would be expected to operate with a BER of less than or equal to the target amount (i.e. at least as good as the target amount).

The definition of SNR margin which is given in the xDSL standard ITU G992.1 Section 9.5.1 is: "Signal-to-Noise Ratio (SNR) margin: The signal-to-noise ratio margin represents the amount of increased received noise (in dB) relative to the noise power that the system is designed to tolerate and still meet the target BER of $10^{-7}$, accounting for all coding (e.g. trellis coding, RS FEC) gains included in the design. The SNR margin ranges from −64.0 dB to +63.5 dB with 0.5 dB steps." (NB "RS FEC" refers to Reed-Solomon "Forward Error Correction" schemes.)

It will thus be appreciated that the lower the SNR Margin, the higher the headline bit rate that will be achievable (i.e. assuming that there are no errors). Whilst, the higher the SNR Margin, the more likely that the connection will operate in a stable manner, even in a fluctuating noise environment.

Fast/interleave mode switches the depth of interleave between no interleave (FAST mode) and any of the depths of interleave defined in the currently applicable ADSL standards (e.g. the ITU G.992.x standards). In many implementations, only the lowest level of interleave (a depth of 2, where units in a single code word which are adjacent before interleaving are separated by one interleaved unit from another word after interleaving) is used at the moment; however, this may change in the future. As is well known in the art, use of interleave protects against short duration noise spikes by interleaving units (e.g. bytes) of a certain number (depending on the depth of interleave) of code words (each comprising several units) where each, code word has a certain amount of error protection such that a relatively small number of errored units per code word can be recovered by the error protection mechanism to recover the original code word completely (e.g. if there are 5 units (e.g. bytes) per code word and the error correction mechanism can recover code words where one unit is errored, an interleave depth of 2 would enable both interleaved words to be recovered if a noise caused two adjacent units within a two word transmission period to become corrupted). Interleaving provides protection against impulsive noises at the expense of increased latency (and greater buffering requirements of network equipment).

The functionality (or sub-components of this functionality) according to embodiments of the present invention may be performed by a number of different devices. In particular, the decision-making regarding the selection of a profile to be applied to a particular data connection may be performed within the aggregation transceiver device (e.g. the DSLAM) or a device associated therewith, or in a separate management device.

Preferably, the different profiles are stored at the network side (e.g. at the DSLAM) and the network operator has responsibility for selecting the actual profile applied to a connection, though this is usually done at least partially in response to messages coming from the end-user's DSL modem. Preferably, the parameters used to determine whether or not a change of profile should be made include the number of times that a re-synch has occurred on a DSL connection within a certain period of time and the number of errored seconds which have occurred within a certain period of time (e.g. within the past 24 hours).

Systems performing methods according to the first aspect may include a "stability policy selector" which selects an appropriate stability policy based on the usage (or intended or requested usage) of the connection. The selector may be user- or operator-configurable and may act as a "state machine", whereby some circumstances may result in a new policy being adopted for some states of the selector but not for others. For example, the selector may have three states, such as "aggressive", "normal" and "stable", and may be configured such that if the selector is in the stable state and the user switches from a video-streaming application to web-browsing, the selector may change state from "stable" to "normal", while if the selector is in the aggressive state and the user switches from a gaming application to web-browsing, the selector may not change state, etc. As with the storage of the stability level or policy, this selector could also be implemented either at the end-user side of the DSL connection (i.e. enabling control of the stability policy to lie with the end-user device) or at the network/DSLAM side of the DSL connection (i.e. enabling the network operator to have responsibility for the currently applied stability level or policy for the connection). The selector may include means for causing a re-synchronisation of the DSL connection where it transitions from one state to another.

Preferably, the data connections are digital subscriber lines including remote and central transceiver units connected over a copper pair and operating in accordance with one or more of the various xDSL standards agreed by the International Telecommunication Union (ITU) (e.g. G.992.x and their annexes).Preferably the aggregation transceiver device is a Digital Subscriber Access Multiplexer (DSLAM).

The profiles may be ranked according to a level of aggressiveness, where more aggressive profiles are, in general, more likely to result in a connection becoming unstable.

According to a second aspect of the invention, there is provided a management device for use in an access network including a plurality of data connections between end-user devices and an aggregation transceiver device where the data connections are aggregated for onward connection through the access network, the access network storing in association with each data connection a profile which specifies a set of values for one or more parameters associated with the respective data connection, the device comprising:

a receiver for obtaining, in respect of each data connection, connection data relating to a monitoring period, said monitoring period comprising a plurality of shorter periods, said connection data comprising, for each of said shorter periods, a first indication indicative of whether or not said data connection has experienced instability during said shorter period, and a second indication indicative of a measure of user activity on said data connection during said shorter period;

a processor unit for selecting, in respect of each data connection, a profile to be applied to that data connection in dependence on the connection data obtained in respect of that data connection; and a requester for requesting an Operational Support System of the access network to apply, to respective data connections, the profile selected in respect of said data connections;

wherein the processor unit is further operable to identify, from the shorter periods within said monitoring period, those shorter periods in respect of which the second indication is indicative of user activity above a predetermined level having been observed on said data connection during said shorter period, and to determine or estimate, from first indications obtained in respect of those shorter periods so-identified, a measure of the number of times that the data connection has experienced instability during those shorter periods so-identified within said monitoring period, discounting first indications obtained in respect of shorter periods in respect of which the second indications are indicative of no user activity having been observed, when selecting a profile to apply to the data connection.

The management device may be a module separate from and even remote from the aggregation transceiver device. Alternatively, the aggregation transceiver device may comprise the management device.

Further aspects of the present invention relate to systems, devices, computer programs and carrier means or media as set out in the accompanying claims, especially tangible carrier means such as optical storage devices (e.g. compact discs (CD's) or DVD's), or magnetic storage devices such as magnetic discs, or non-volatile solid-state memory devices.

The various options and preferred embodiments referred to above in relation to the first aspect are also applicable in relation to the second and further aspects.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

The main embodiment described below uses a management device 100 to perform two principal functions—Broadband Remote Access Server (BRAS) provisioning and Dynamic Line Management (DLM). The BRAS provisioning is described in brief in this application, for the sake of completeness, but it is described in greater detail in co-pending International patent applications WO2007/012869 and WO2007/012867, for readers interested in the particulars of the preferred methods of BRAS provisioning applicable to the main embodiment.

As for the DLM function, this is desirable in the main embodiment because the downstream speed of the ADSL connections controlled by the management device of the main embodiment rate adapts to the highest speed the line can support from 2 Mb to 8 Mb. As the ADSL connections are running at their maximum limits they are more susceptible to noise which can cause errors and spontaneous resynchronisations (re-synchs).

In overview, the role of the DLM function of the management device is to ensure that the ADSL connections provide a good compromise between the stability of the line and the performance of the line in terms of bit rate (or perhaps more importantly the rate at which a user can receive desired data—after any lost packets caused by errors have been re-sent, for example) and latency. The DLM function does this by receiving data from DSLAM Data Collectors each day and processing this received data. The DLM function is then able to increase or decrease the noise margins (i.e. the SNR margins) and/or interleave levels as required by setting a new profile for each ADSL connection (using the existing provisioning systems for setting profiles at DSLAMs). This basic functionality may be enhanced with logic to minimise churn or oscillation of profiles (by attempting to stabilise the DSLAM profile for each connection, rather than reacting to every relevant change in the environment of the connection which could cause the maximum stable profile applicable to change).

Main Embodiment

Figure 1:
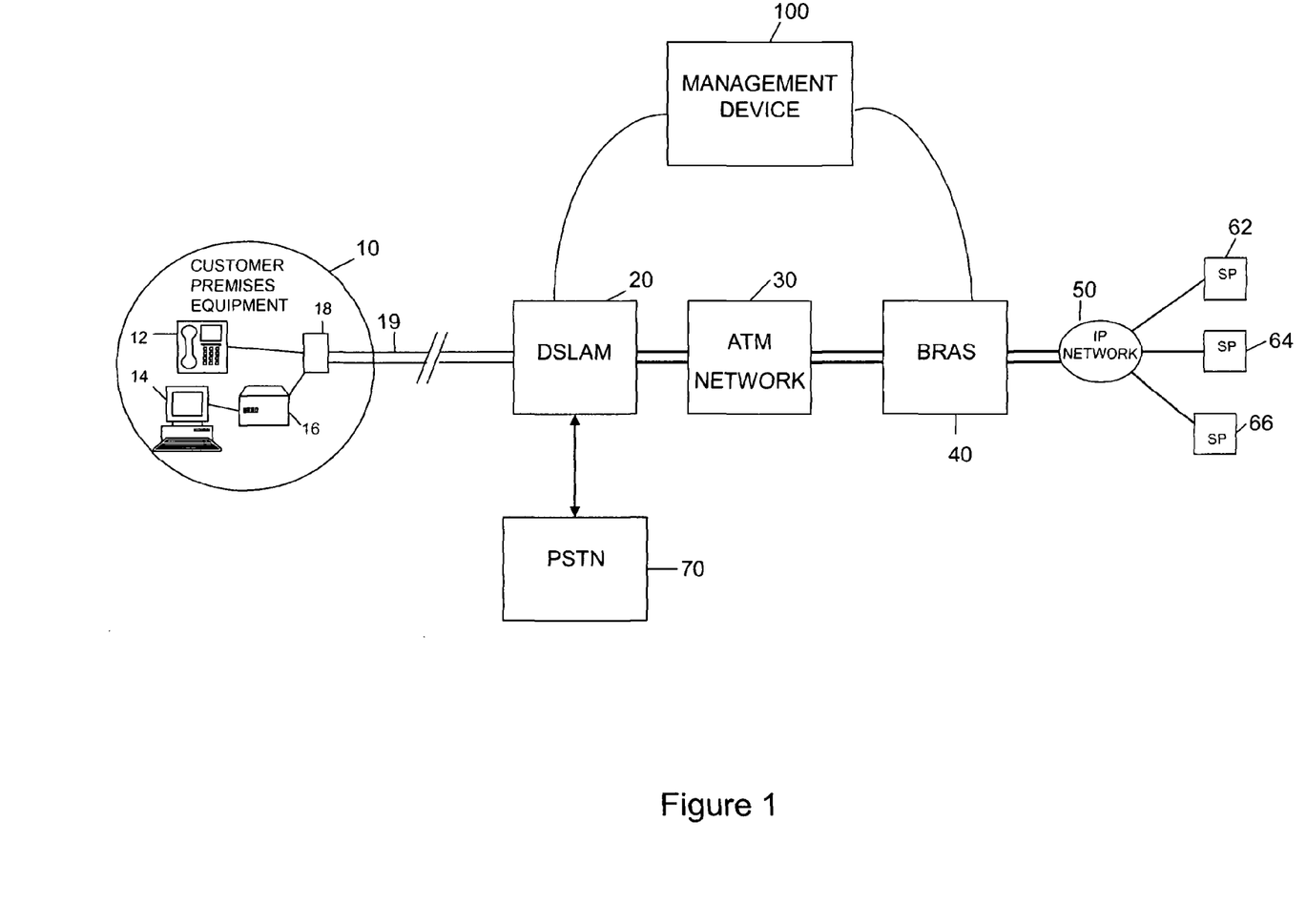
FIG. 1 is a schematic block diagram illustrating a telecommunications network incorporating a management device operating in accordance with a method according to the present invention.

Referring to FIG. 1, a first embodiment of the present invention is illustrated in overview. A copper pair loop 19 (which forms part of the access network which extends between customer premises equipment 10 and the BRAS 40) connects customer premises equipment 10 to a DSLAM 20 located within a local exchange (also known as a central office in the US). The DSLAM separates normal voice traffic and data traffic and sends the voice traffic to the Public Switched Telephone Network (PSTN) 70. The data traffic is passed on through an Asynchronous Transfer Mode (ATM) network 30 which forms the remainder of the access network 19, 20, 30 (in the present embodiment, the ATM network 30 is British Telecom (BT)'s Multi Service intranet Platform (MSiP) ATM network). Connected to the ATM network 30 is a Broadband Remote Access Server (BRAS) 40 at which several IP traffic flows or ATM circuits from (and to) multiple Service Providers (SP's) 62, 64, 66 are aggregated (and disaggregated) via an IP network 50 (which in this case is BT's Colossus IP network)—which itself may run over an ATM network or networks. Within the customer premises equipment 10, there is an ADSL splitter filter 18, a telephone 12, an ADSL modem 16 and a computer 14.

In some cases the first hop of an IP packet travelling from computer 14 towards an ISP 62, 64, 66 would be the BRAS 40; whereas in other cases the first hop from an IP perspective could be beyond the BRAS 40.

In all cases, the end-user's modem 16 creates a Point-to-Point Protocol (PPP) session from the modem to another device in the network. This is a logical end to end connection that carries the end-user's traffic from the modem to the target IP network.

In some cases, the PPP session is terminated on the BRAS, and then onward routed directly onto the Internet.

In one example configuration where the PPP session is not terminated at the BRAS 40, the PPP session is terminated on a "home gateway" at the edge of the core network, connected to the Service Provider (SP). In another example configuration a Layer 2 Tunnelling Protocol (L2TP) tunnel is used to pass through the BRAS 40 to a terminating BRAS which belongs to the SP; the L2TP tunnel tunnels all the PPP sessions into the SP network for them to handle as they want.

Generally, the first IP hop is from the end-user to the terminating BRAS (i.e. over the PPP connection). Furthermore, in all cases, the BRAS 40 is responsible for policing the amount of traffic flowing downstream (i.e. from the network towards the customer premises equipment) towards each line connected to the BRAS 40, to ensure that it does not exceed a maximum amount provisioned for that line. This policing is either done at the IP layer (where the BRAS 40 terminates a PPP connection from the customer premises equipment 10) or at a lower level (e.g. at the ATM layer) where there is some sort of sub-IP layer tunnelling through the BRAS 40.

The above mentioned arrangement of items 10, 19, 20, 30, 40, 50, 62, 64, 66 and 70 is conventional. However, in addition to this conventional arrangement, in the present embodiment there is a management device 100 which communicates with both the DSLAM 20 and the BRAS 40. The detailed operation of this device (especially as regards its DLM function) is explained in greater detail below with reference to FIGS. 2 and 3. However, in overview it obtains information from the DSLAM 20 about the rate at which each Digital Subscriber Line (DSL) connects to the DSLAM and information about events such as detected errors and/or re-synchs occurring on the line/connection and modifies the operation of the DSLAMs as regards the aggressiveness of the profile used by a respective DSLAM for a respective DSL connection.

Figure 2:
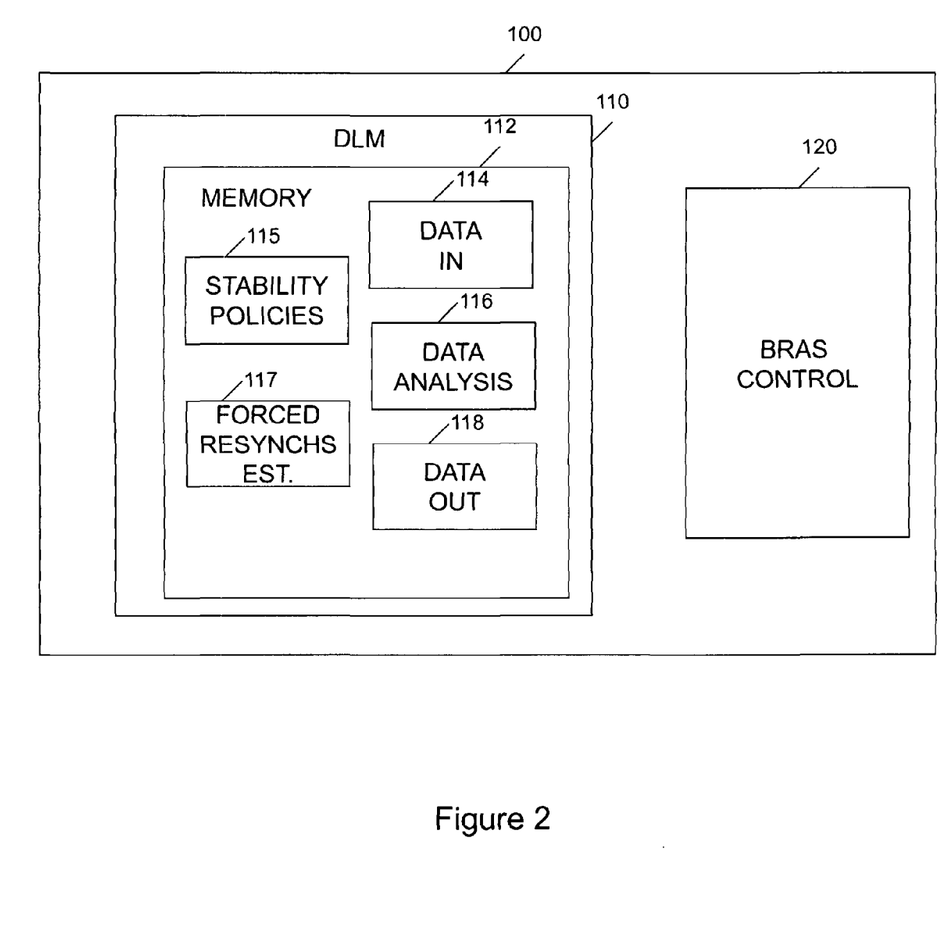
FIG. 2 is a schematic block diagram illustrating the management device of FIG. 1 in more detail.

As shown in FIG. 2, the management device 100 comprises two main functional parts, a BRAS provisioning or BRAS control function 120 and a Dynamic Line Management (DLM) function 110.

The BRAS provisioning function 120 processes part of the information received from the DSLAMs to assess a consistent connection speed achieved by each DSL. If it determines that this consistent rate has increased as a result of recent higher rate connections, it instructs the BRAS to allow higher through flows of traffic for that DSL. On the other hand, if it detects that a particular connection speed is below the stored consistent value, it reduces the consistent value to the current connection rate and immediately informs the BRAS of the new consistent value rate so that the BRAS does not allow more traffic to flow to the DSL than the DSL is currently able to cope with.

Precise details of some of the algorithms which may be used by the BRAS Control function 120 of the management device 100 to calculate a consistent rate in the present embodiment are described in International applications WO2007/012869 and WO2007/012867 (referred to above). It should be noted however that the intention of these algorithms may be to arrange for the user to receive data at the highest rate which his/her DSL is consistently able to obtain without requiring the BRAS to be reconfigured every time the DSL is connected at a new maximum rate. At the same time the algorithms seek to ensure that if a DSL connects at a rate which is below that at which the BRAS is currently configured to allow data through for that DSL, then the BRAS is quickly reconfigured to avoid overloading the DSLAM.

Details of the particular algorithm employed in the present embodiment by the DLM function are set out below. In overview however, a DLM data receiving sub-function receives a new file daily from each element manager, the file containing up to 96 timeslots (i.e. 15-minute periods) per DSL connection per day together with information about a stability policy or level associated with each connection.

As will be explained later, before any decision regarding the possible selection of a new profile for a particular connection is taken, information from the received file is essentially filtered in order to extract and use information that enables such a decision to be taken in a way that may be better aligned with what an end-user of the connection may benefit from or appreciate. In the main embodiment described here, the filtering is performed by the DLM function after it received the complete (i.e. unfiltered) file, but it will be appreciated that the filtering may equally well be performed by another entity such as the DSLAM 20, in which case the management device 100 may receive the already-filtered file, in respect of which the DLM function may act.

Briefly, however, and irrespective of which entity performs the "filtering", two types of data are obtained in respect of each of a number of "shorter periods" (such as the ninety-six 15-minute "bins") within a longer "monitoring period" (such as the 24-hour period). The data obtained in respect of each "bin" includes the following:

(i) indications of any instability within the 15-minute period in question; and (ii) indications of any user activity within the 15-minute period in question.

The bins can then be thought of as "active" if it is determined that there has been user activity within the 15-minute period in question, or "inactive (or "dormant")" otherwise. The decision as to whether it is appropriate to select a new profile for the data connection in question can then be taken on the basis of indications of any instability obtained in respect of the "active" bins, thereby allowing whatever instability may have occurred during "inactive" bins to be ignored, as the end-user is unlikely to have been affected by this.

Manners in which the above may be achieved will be discussed in more detail later.

The data, having been "filtered" is used in a DLM analysis sub-function to determine if changes to the DSLAM profile are required to stabilise the end-user's service to comply with the connection's respective associated stability policy or level. If changes are required, a DLM output sub-function sends a request to the Operational Support System (OSS) of the access network for the profile applied to the line to be changed. The precise way in which this is performed will depend on the details of the OSS of the particular access network and is not relevant to the present invention and so will riot be described further herein.

Each of the DLM sub-functions mentioned above may be implemented by standard computer processor components operating in accordance with software code modules stored in a memory 112 forming part of the DLM function 110; in particular, a DLM data receiving code module 114 (DATA IN) causes implementation of the DLM data receiving sub-function, a DLM analysis code module 116 (DATA ANALYSIS) causes implementation of the DLM analysis sub-function and a DLM output code module 118 (DATA OUT) causes implementation of the DLM output sub-function. Additionally, the memory 112 also stores the stability policy data set 115 (STABILITY POLICIES) in which the stability level or policy associated with each DSL connection managed by the management device is held. Furthermore, the memory 112 may also store a forced resynchronisation estimation module 117 (FORCED RESYNCHS EST.) for implementing a sub-function to estimate the number of resynchronisations for each line in each batch of data caused as a result of some sort of error, etc. occurring in the connection rather than as a result of user actions (e.g. to switch off or disconnect their DSL modem). This forced resynchronisation estimation sub-function is described in greater detail below.

The main source of input data for the DLM function is a daily file from each element manager, giving an aggregated report of each line's activity over the preceding 24-hour monitoring period. As mentioned above, the DLM function is arranged either not to receive, or to receive but then discount information relating to any 15-minute timeslots in respect of which it has been determined that the user was not actively using the line for sending or receiving data—this will be discussed in more detail below. This generally results in a change in DSLAM profile being applied no more frequently than once every 24 hours which is advantageous because it avoids the possibility of the DSLAM being reconfigured every time a line re-synchs. In addition however, the DLM function additionally receives input data specifying a stability level for each line. In the present embodiment, this is input from a database into which the data is manually entered by an operator as part of the process of provisioning a new DSL connection and is stored within the stability policies data set 115 within the DLM memory 112. Thus in the present embodiment, the intention is that when a customer orders a DSL connection he/she is offered different levels of stability (which will be most suitable for certain different types of activity); thus customers who mostly intend to use the connection for video streaming will benefit from a stable connection, whereas customers mostly using their connection for downloading large files, etc. would benefit from a higher bit-rate rather than from very high stability levels. Alternatively, instead of providing this facility on an end-user by end-user basis, retail customers (i.e. Service Providers) of the network service operator (i.e. a wholesale network operator) could be provided with the option to select a stability level on behalf of their customers and could sell this on to their (end-user) customers as a "specialised" product offering.

However, in alternative embodiments, the stability level could be updated more dynamically, as a result of a request by the user. In an example embodiment, a web server could be provided to receive user requests for a change of stability level (perhaps with a maximum permitted frequency of requests permitted per user, e.g. no more than one per hour or one per day, etc.) and this could then cause the DLM function as soon as possible to re-run it's comparison process for that line with the newly requested stability level and, if as a result of the comparison it is determined appropriate to transition to a new profile, then to transition to the new profile, again as soon as possible so that the user experiences a fairly dynamic response to a request to change the stability level.

Each time a line is checked to see if its profile should be changed (which in the present embodiment occurs once every 24 hours as part of a batch processing function), the corresponding stability level associated with that line is read and then threshold values for that line are set depending on the stability level associated with the respective line. The daily file data is then processed and the data for the respective line being analysed is compared with the threshold values set for that line in dependence upon the stability level associated with the line. If the comparison indicates that a transition should be made, then a corresponding instruction is issued to the OSS system for a corresponding transition to be made.

The DSLAM profile has two parameters which are adjusted in the various different profiles available for the DLM function to choose between in order to improve the stability of the line or conversely to improve the bit-rate or low-latency of the connection: the target margin and the run mode (the latter enabling the use of interleaving). The default line profile which is initially applied to all lines has a target margin of 6 db and interleaving disabled (often referred to as being in FAST mode). Changing these parameters is based on two performance metrics in the present embodiment, errors (in particular, in this embodiment, errors caused by code-violations) and re-trains (i.e. re-synchs).

The number of errors and re-trains is normalised to up-time (i.e. total synchronised time during the 24-hour period and during which the user is deemed to have been active with regard to their networked devices and the network connection) to form the actual performance metrics used to determine the stability of the line. For example 10 errors in 1 hour of up-time after normalisation is (quite sensibly) very different from 10 errors in 1 minute of up-time, or (in user-perception terms) from 10 errors in 1 hour during which the user was not actually making active use of the connection. The normalisation is performed by calculating a mean-time-between either errors or re-synchs. Furthermore, the re-trains parameter may also be processed, prior to use as a stability performance metric, by discounting the number of re-synchs deemed to be user-caused re-synchs, prior to calculating the mean-time-between re-synchs, as these can be deemed not to have been caused directly by line instability.

Having calculated the metrics to be used in assessing the stability of the line, a check is made against thresholds, etc. as described in greater detail below, and if it is deemed necessary or desirable a change in profile will be made.

In general, if a move to a less aggressive profile is deemed necessary, a move over to an interleaved profile is made in preference to an increase in the target margin. Initially an interleaved profile is set with the same corresponding target margin as the previous fast mode profile (i.e. 6 dB fast would transition to 6 dB interleaved).

If a customer has opted-out of the option to apply interleaving (e.g. because low latency is more important to them than maximum bit-rate—such as is often the case for customers who are on-line gamers or VOIP or video conference users) then transitions are only made between fast mode profiles (only the target margin is varied). This clearly limits the capability of the DLM process.

Before a transition is made, a check is made against line rate to ensure that a line is capable of making the transition to a new profile without suffering a bit rate drop so drastic that it would fall below a predetermined minimum acceptable bit rate. A transition is only made if there is some confidence that the line will be capable of supporting service above this minimum acceptable rate once the new profile is applied. For example, in the present embodiment a transition to a higher noise margin profile is only made if the current bit rate is approximately 800 kbps greater than a Fault Threshold Rate (FTR) (the FTR represents the minimum acceptable bit rate as determined by the network operator—in the present embodiment, the network operator is a wholesaler of network services and supplies these services to network retailers, or Service Providers, who in turn supply consumers; the Maximum Stable Rate is a parameter which is determined by the wholesaler network operator and provided to the service provider as an indication of the estimated capability of the line, the FTR is related to the MSR but is set below this and is used to trigger a fault report if the connection rate ever falls below the FTR since this is an indication that the line is performing significantly below the rate that it is believed to be capable of operating at). If the line is unstable and yet cannot make the transition because it would drop below its minimum acceptable bit rate (i.e. the FTR), then this is flagged for further investigation. In the present embodiment, the FTR is initially set at 2 Mbs and is then re-set to 80% of the Maximum Stable Rate detected by the network during the first 10 days of operation of the DSL in its rate adaptive mode.

If a line fails to synchronise then a transition will be made to a lower target margin. If this means returning to a previously unstable state then this is flagged for further investigation as the line is not effectively stabilised (even though it isn't at the maximum target margin). The line is returned to the previous unstable state so that some level of service can be provided to the customer whilst an investigation takes place.

If a line fails to synchronise even at the lowest target margin then it is flagged for investigation. For example, it may not be able to support the required service or the line may be faulty.

Similarly, if a line is still unstable at the maximum possible target margin then it is flagged for further investigation. For example the line may be faulty.

If a line is completely stable then in general the DLM function moves the line to a lower target margin (or interleave depth) to increase the available capacity (or reduce the latency) on the line (remember 3 dB≈800 kbps). However, these transitions are handled carefully to avoid frequent changes in target margin (or interleave depth) up and down. Thus if a line has previously been moved from a more aggressive lower target margin (or less interleaved) profile to the current target margin (and interleave depth), it must wait a considerably longer time (e.g. a week, or a month) before being re-transitioned back to the lower target margin (or interleave depth) profile than if it has not previously been moved back from the lower target margin (or interleave depth) profile.

In the present embodiment, there is a manual process to enable the transition between any line profile (e.g. 3 dB fast straight to 15 dB interleaved is possible by manual intervention).

In the present embodiment, those lines, which have been flagged for further investigation are pro-actively repaired in the hope that they can be repaired before any fault report is generated.

Re-profiling requests to move to a less aggressive profile can occur on a daily basis. Re-profiling decisions on stable lines to move to a more aggressive profile to increase overall capacity are made over a longer time period (which generally increases with the number of times that the line has previously been moved off the target profile because of lack of stability issues) as discussed in the preceding paragraph.

In the present embodiment, each line is categorised by the first sub-function of the DLM function into one of four different categories in dependence upon the normalised number of errors and/or re-synchs as reported to the DLM function in the bulk file. The categories correspond to "very poor", "poor", "acceptable" and "very stable" (these categories may alternatively be referred to as "very poor", "poor", "OK" and "good", or in other ways).

Figure 4:
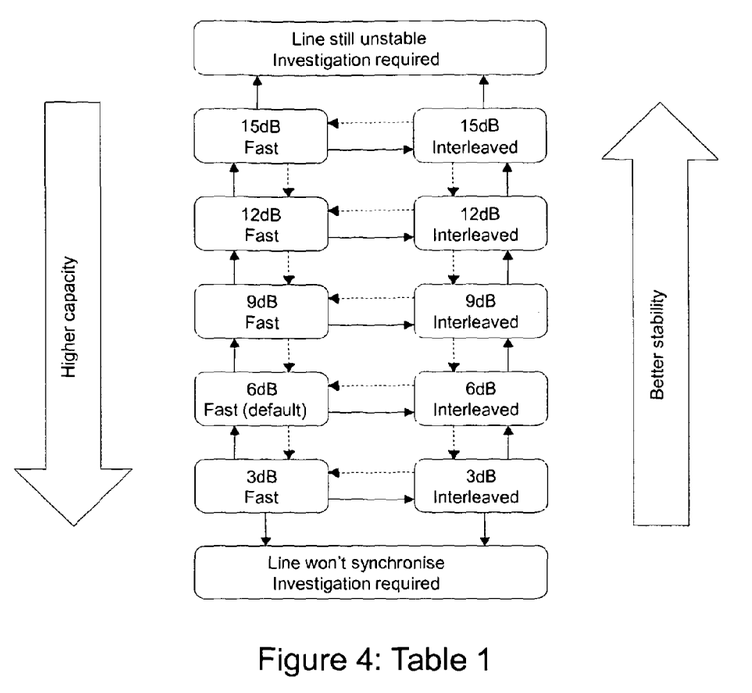
FIG. 4 shows Table 1 as referred to in the description, which shows the basic flow of the DLM process.

The basic flow of the DLM process is shown in Table 1 included as FIG. 4. In the present embodiment, the general progression through the profiles shown in Table 1 is as follows: if a line is to be changed to a more stable profile, the first change is to move to the profile with the same target margin but in interleaved mode instead of fast mode, if the line is already in an interleaved mode, then the line is moved to the next higher target margin profile also in interleaved mode. If the line is to be moved in the direction of increased capacity, it is kept in the same mode (i.e. fast or interleaved) but moved to the next lower target profile, unless it is at the minimum target margin in interleaved mode, in which case it is moved to the minimum target margin profile in fast mode.

In the second sub-function of the DLM function, a line categorised as very poor is immediately moved two steps in the better stability direction (e.g. from 6 dB Fast profile it would move to 9 dB Interleaved, from 6 dB Interleaved it would move to 12 dB Interleaved, etc.). A line categorised as poor is immediately (although with lower priority than the re-profiling of any very poor categorised lines) moved one step in the better stability direction (e.g. from 6dB Fast to 6 dB Interleaved or from 9 dB interleaved to 12 dB Interleaved). A line categorised as acceptable is maintained on its current profile (i.e. no action is'taken). A line categorised as very stable is moved (if the further requirements to avoid oscillations etc. are also satisfied) one step in the higher capacity direction (e.g. from 6 dB Fast to 3 dB Fast, from 9 dB Interleaved to 6 dB Interleaved or from 3 dB Interleaved to 3 dB Fast).

In the present embodiment, each line is processed once every 24 hours to determine how the line should be categorised, and thus if a new profile should be selected for that line. In order to avoid frequent oscillations between adjacent profiles, a good and a bad delay counter are used to place a delay on how quickly a line is re-profiled. Thus, every time a line is categorised as good a good delay counter is incremented (and a poor delay counter is decremented) and only once the good delay counter has reached a good threshold (which in the present embodiment is set to 13) is a request made to the OSS for the profile to be increased by one step to a more aggressive level, and then the delay counters are reset. Furthermore, every time a line is categorised as poor, a poor delay counter is incremented (and the good delay counter is decremented) and only once the poor delay counter reaches a poor threshold (which in the present embodiment is set to 3) is its profile dropped by one step to a less aggressive level. The delay counters are never decremented below 0 such that even if a line has experienced a number of good days (such that the poor delay counter has been decremented to zero, e.g. five good days in a row) only 3 days in a row of the line behaving poorly are required for the poor threshold to be reached causing a re-profiling. Furthermore, a delay doubler is used to increase the delay (i.e. by increasing the good threshold) required before a line which has moved down from a more aggressive profile to a less aggressive profile level is allowed to re-transition back up to the more aggressive level. The delay doubler is therefore incremented (in the present embodiment up to a maximum of 5) whenever the line is re-profiled to a less aggressive level and then the delays are reset (as in the case where the line is re-profiled to a more aggressive level). Resetting the delays is done according to the following formulas:

GOOD THRESHOLD=DEFAULT GOOD THRESHOLD* 2EXP(DELAY DOUBLER) POOR DELAY COUNTER=GOOD DELAY COUNTER=0

The DEFAULT GOOD THRESHOLD is set in the present embodiment to 13 (i.e. equivalent to 14 days), the DEFAULT POOR DELAY is set in the present embodiment to 3 (i.e. equivalent to 3 days) and the DELAY DOUBLER is set to 0, thus the initial good delay is 13 but each time the line's profile is transitioned to a less aggressive profile the DELAY DOUBLER is incremented until after 5 such transitions, each time the DELAY is reset it is reset to a value of 448 (i.e. equivalent to approx 14 months). In the present embodiment, if a user's stability policy or level is changed the delay doubler is reset back to zero; furthermore, the delay doubler and even the delay counter may be manually reset by an operator to cater for exceptional circumstances.

Figure 3:
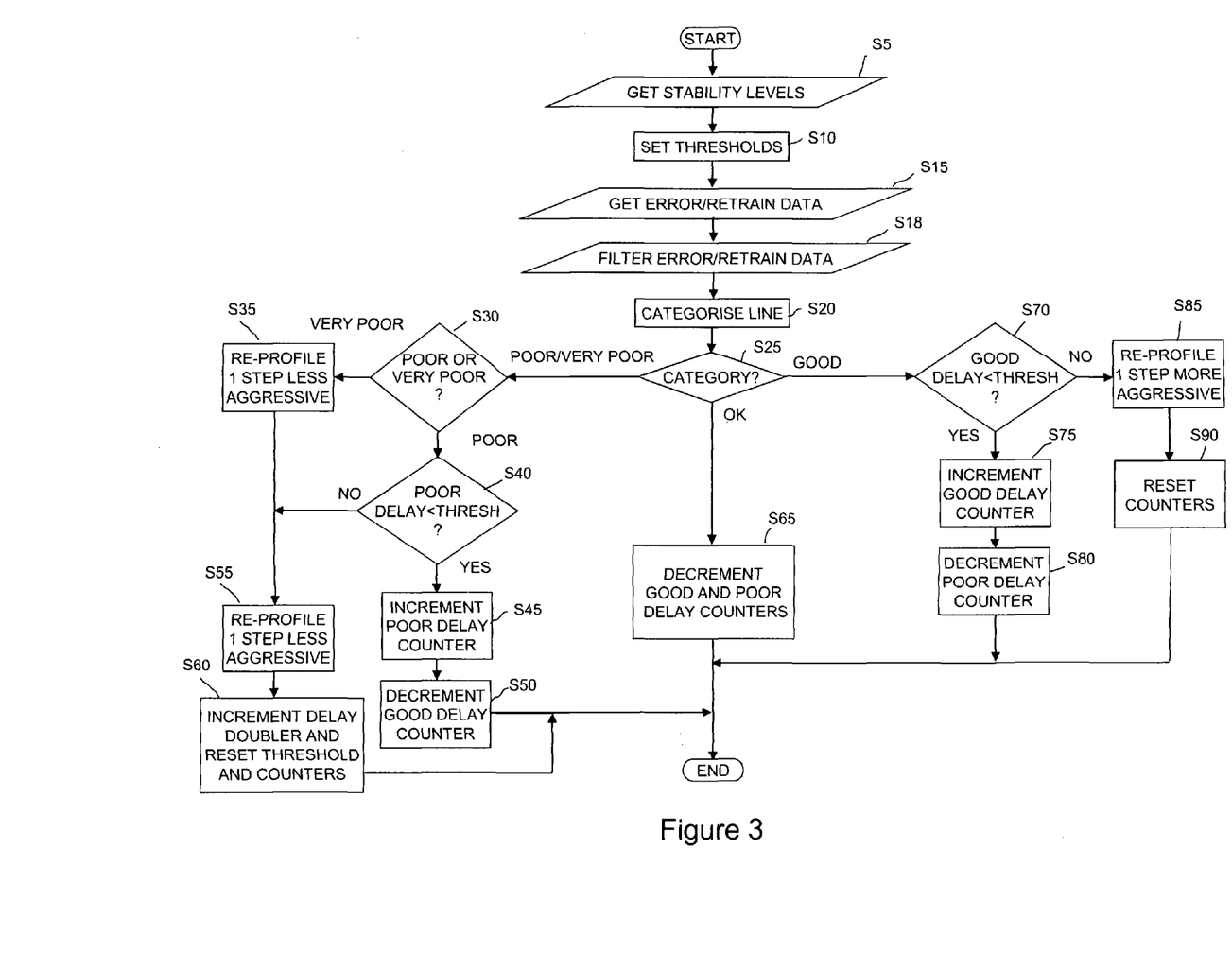
FIG. 3 is a flow diagram illustrating the steps carried out by the management device of FIG. 1 in order to control the DLM profile applied to the DSL connections in the network of FIG. 1.

In the present embodiment, the specific functionality of the DLM function to permit different lines to operate at different levels of stability according to stability policies set for each line, is now described below with reference to FIG. 3. In brief, before the DLM performs its line categorisation function for a particular line, its associated stability level may be determined and then the categorisation may be based on the threshold values associated with the respective stability level, each stability level having a different set of associated threshold values for use in the categorisation function. Thus, at step S5 the stability level for the particular line to be categorised is obtained together with the delay data stored for that line (i.e. the current value for the delay counter, DELAY, which, as mentioned above, is initially set to a value of 3 and the current value of the delay doubler, DELAY DOUBLER, which is initially set to a value of 0).

The process then moves to step S10 in which the threshold values associated with the stability level looked up in step S5 are obtained for use in the remainder of the process and then the process proceeds to step S15.

At step S15 the DLM function obtains the current error and re-synch data which it has received in respect of the present line being analysed. This is read from the daily data file which is sent to the DLM function on a daily basis as described above. The process then proceeds to step S18.

At step S18, a filtering step is performed in respect of the ninety-six 15-minute "bins" received in respect of the previous 24-hour monitoring period (in the present embodiment) for the particular DSL connection in question. For each 15-minute period, data is received indicative of (amongst others) two particular types of characteristic:

data indicative of instability; and
data indicative of user activity

The indications of instability may be indications that one or more re-synchronisations occurred during the 15-minute period in question—these may be taken as indications that the connection experienced sufficient instability during that period that the connection temporarily failed, and needed to be re-established.

As well as or instead of indications relating to whether any re-synchronisations occurred during the 15-minute period in question, indications that one or more data errors occurred during the 15-minute period in question may be taken as indications that the connection experienced instability during that period.

The indications of user activity may be taken from upstream and/or downstream traffic counts, indicating the amount of data (in kilobytes, for example) that has traversed the connection during the 15-minute period in question. If upstream and downstream user traffic counts are both used, they may simply be added to obtain an indication of the total user traffic on the connection during the 15-minute period in question. A non-zero traffic count is taken as an indication that the user has been making active use of the connection during the 15-minute period in question, whereas a zero traffic count in taken as an indication to the contrary.

This filtering step involves inspecting the traffic count in respect of each "bin", and identifying bins in respect of which the traffic count data is indicative of at least some user activity having been observed on the data connection during the 15-minute period in question. For any such bins, the associated instability indications are obtained for subsequent use in categorising the line in step S20. For any bins in respect of which the traffic count data is indicative of no user activity (or user activity below a minimum threshold) having been observed on the data connection during the 15-minute period in question, the associated instability indications are discounted when subsequently categorising the line in step S20.

The process then proceeds to step S20. Step S20 is the step responsible for actually categorising lines into one of four possible different categories (i.e. "very poor", "poor", "OK" and "good", or whichever names are applicable). To do this both of the metrics used in the present embodiment, namely no. of errors detected (at both the user modem and the network modem in the DSLAM) and the number of re-synchs (as recorded by the DSLAM) are compared (after normalisation as mentioned above) with various corresponding thresholds whose values are set according to the stability level to which the line is assigned.

Table 2 (included as FIG. 5) sets out the various thresholds used in the present embodiment. In table 2 "mtb" stands for "mean time between" and thus corresponds to the normalised metrics calculated by dividing the total time in seconds for which the respective line has been in synchronisation and in active use over the past 24-hour period of the monitoring by the number of re-trains or errors recorded in that period. For all cases, in the present embodiment, if there are more than 10 re-trains in any one hour period, the line is assumed to be very poor, regardless of the number of errors recorded. For lines operating at an aggressive stability level, if the average time between retrains is less than once per hour (=3600 seconds) (e.g. 6 re-trains in less than 5 hours of "active up-time") or if the average time between errors is less than one per 10 seconds of active up-time, then the line is deemed to be poor; if the average time between re-trains is less than once every 2.4 hours (but more than once every hour) of active up-time or the average time between errors is less than once every 2.4 hours (but more than once every 10 seconds) of active up-time then the line is deemed to be "OK", whereas if the average time between re-trains is greater than or equal to once every 2.4 hours or if the average time between errors is greater than or equal to once every 2.4 hours, then the line is deemed to be good. From Table 2, it is clear what the thresholds are for the other stability levels in the same way.

In an alternative embodiment, the stability levels could operate such that for the most aggressive stability level the DLM function attempts to keep sync losses to below 12 per 24-hour period (including switching off modems/routers which count as a sync loss) and to keep the line error-free for 98.3% (59/60 seconds) of active uptime measured over a 24-hour period; for the normal stability level the DLM function attempts to keep sync losses to below 6 per 24-hour period and to keep the line error-free for 99.8% (599/600 seconds) of active uptime measured over a 24-hour period; and for the stable stability level the DLM function attempts to keep sync losses to below 3 per 24-hour period and to keep the line error-free more than 99.98% (5999/6000 seconds) of active uptime measured over a 24-hour period.

Figure 5:
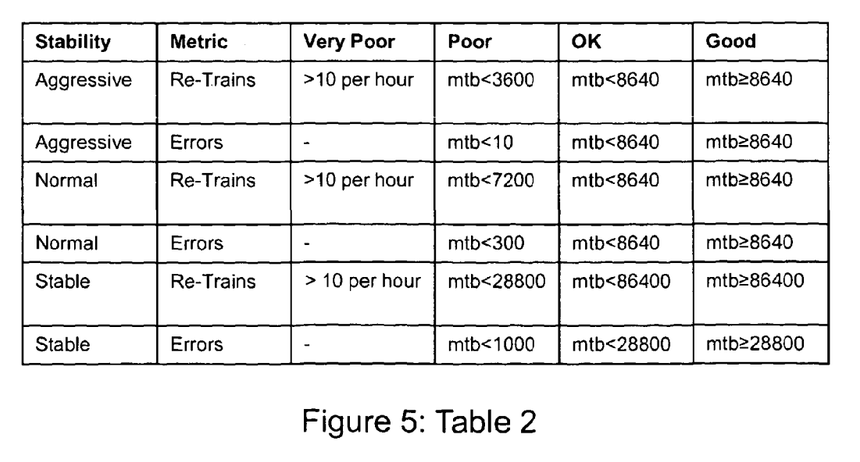
FIG. 5 shows Table 2 as referred to in the description, which shows thresholds for categorising lines.

Having categorised the line according to Table 2 in step S20 the process proceeds to step S25 where it is determined if the line has been categorised as being "poor", "very poor", "OK" or "good". If the line is categorised as being "poor" or "very poor", the process proceeds to step S30 in which it is determined if the line has been categorised as very poor or poor. If at step S30 it is determined that the line has been categorised as very poor then the process proceeds to step S35 in which an OSS request is issued for the line DLM profile to be transitioned 2 steps in the less aggressive direction, provided it is at least two steps above the minimally aggressive level (which, in the present embodiment is 15 dB, Interleaved as is clear form Table 1), otherwise it just transitions straight to this minimally aggressive level; if the line is already at this minimally aggressive level, it remains there but a fault is flagged to the system for attention by an engineer. Upon completion of step S35, the method proceeds to step S60.

If at step S30 it is determined that the line has been categorised as poor, the process proceeds to step S40 in which it is determined if the poor delay counter is less than the poor threshold. If so, the method proceeds to step S45 in which the poor delay counter is incremented (by one) then the method proceeds to step S50 in which the good delay counter is decremented (by one). Upon completion of step S50, the process ends (for the respective line). If at step S40 it is determined, on the other hand, that the delay counter equals (or exceeds) the poor threshold, then the method proceeds to step S55 in which an OSS request is issued for the line DLM profile to be transitioned 1 step in the less aggressive direction, provided it is not already at the minimally aggressive level (which, in the present embodiment is 15 dB, Interleaved, as is clear form Table 1), otherwise it remains there (i.e. at the minimally aggressive level) but a fault is flagged to the system for attention by an engineer. On completing step S55, the method proceeds to step S60.

At step S60, which is arrived at either after performing a two step less aggressive reprofiling in step S35 or after performing a one step reprofiling in step S55, the delay doubler is incremented by one (provided it has not already reached its maximum value of 5 in which case it just stays at 5) and then the good threshold is reset according to the formula GOOD THRESHOLD=DEFAULT GOOD THRESHOLD* 2EXP (DELAY DOUBLER). Finally in step S60, the poor and good delay counters are both reset to zero. Upon completion of step S60, the method ends (for the respective line being processed) and the DLM function moves on to analysing any further lines requiring analysis in the current 24-hour period batch process.

If at step S25 it is determined that the line is categorised as OK, then the process proceeds to step S65 in which the good and bad delay counters are both decremented by one (although if a counter is already at zero it is not decremented further but rather stays at zero). This decrementing of the delay counters for lines which are categorised as OK ensures that lines which are only occasionally good or only occasionally bad but mostly are OK, will remain on there current profile setting. Upon completion of step S65, the process (for the respective line being processed) ends.

If at step S25 it is determined that the line is "good", the method proceeds to step S70 in which it is determined if the good delay counter is less than the good threshold. If so, the process proceeds to step S75 in which the good delay counter for the line in question, (GOOD DELAY), is incremented (by one). Upon completion of step S75, the process proceeds to step S80 in which the poor delay counter (POOR DELAY) is decremented; this helps to prevent lines which are typically good as often as they are poor from being moved to a different profile. Upon completion of step S80, the process (for the respective line being processed) ends.

If at step S70 it is determined that the good delay counter (GOOD DELAY) is not less than the good threshold (GOOD THRESHOLD)—i.e. it has reached or exceeded the threshold—then the process proceeds to step S85 in which an OSS request is made to transition the DLM profile of the line one step in the more aggressive direction (provided it is not already at the most aggressive profile, which, in the present embodiment is 3 dB non-interleaved mode, as is clear from Table 1, in which case it simply stays at this most aggressive profile). Upon completion of step S85, the method proceeds to step S90 in which the delay counters, GOOD DELAY and POOR DELAY, for the line is reset and then the process (for the respective line) ends. As mentioned above, once the process ends for the current line being processed, the DLM function moves on to analysing any further lines requiring analysis in the current 24-hour period batch process.

An alternative embodiment relates to DSL connections which are operable to operate in different power modes in particular including a low-power mode which is entered when little or no user data is being sent over the connection (in either direction). Such a low-power mode is included in the ITU-T G.992.3 standard which introduces an L2 mode; basically, the DSL line monitors (e.g. one or both of the DSL transceivers—usually the Central Office end DSL transceiver) the data throughput on the line and when there is no or very little data being transferred on the line, then it can request (to the other transceiver—e.g. the remote or user end transceiver) a transition into the L2 low-power mode. This reduces the power and bit rate of the line; the moment more bandwidth is required than can be supported by the L2 low-power mode rate, the line shifts back to the previous (high-power) L0 rate. Thus tracking for operation in the L2 low-power mode should track pretty much when the line is/isn't in use.

In this embodiment, additional parameters in the DLM performance metric field are collected in respect of each bin, the main one being a power mode status indicator, which specifies which power mode the line is in for each 15-minute bin. The management device 10 ignores any data in respect of bins where the power mode status is flagged as "L2", effectively discarding or discounting the performance for the line when it is in L2 mode, but it calculates the mean time between errors and mean time between retrains as normal for the line when in "L0" mode, hence only taking into account performance data for when the line is being used to carry data.

This embodiment applies not only to ADSL2 and ADSL2+ transceivers operating with L2 mode capability as set out in G.992.3 and related standards, but also to other forms of DSL (e.g. VDSL) if they include such a low-power capability for low user data rate situations. It is likely that VDSL transceivers will shortly (if they don't already) have such capabilities. This embodiment thus applies equally to such DSL transceivers as and when they are available.

In some embodiments in which a low-power mode such as the L2 mode in G.992.3 is implemented, it may be the case that if synchronisation is lost whilst the line is in such a low-power mode, it will immediately attempt to retrain and go into the normal high-power mode until a timeout period of little or no user activity (which may be set at a value greater than a plurality of bin periods) has elapsed. Also, the manner in which an indicator of power mode is set for a particular bin may vary in different embodiments. In cases where the indicator is set to indicate that the line has been in a low-power mode for any part of a bin (even if only briefly in the middle of the period covered by the bin, for example), it is straightforward since if there is, for example, a retrain event occurring whilst the line is in a low-power mode and then it immediately retrains and goes into a high-power mode, the retrain will be discounted since it occurs in a bin which will be marked as being in a low-power mode. The same would be true for cases where the indicator is set based only on the power mode of the line at the start of a bin. However, for cases where the indicator is set based on the power mode of the line at the end of the bin such retrains would not automatically be discounted since they would normally seem to occur in bins not in a low-power mode. To overcome this problem, some additional intelligence may be required such as, for example, discounting retrains which occur immediately after a low-power mode bin, or discounting retrains which occur within a bin immediately following a low-power mode bin and where the line returns to a low-power mode within a predetermined minimum number of bins (consistent with the timeout period before which a newly-retrained but unused line will fall back to the low-power mode again after a retrain), etc.

The invention claimed is:

1. A method of operating an access network including a plurality of data connections between end-user devices and an aggregation transceiver device at which the data connections are aggregated for onward connection through the access network, the method comprising:

storing a plurality of different profiles, each profile specifying a set of values for one or more parameters associated with each data connection; and, for each data connection;

obtaining connection data relating to a monitoring period, said monitoring period comprising a plurality of shorter periods, said connection data comprising, for each of said shorter periods, a first indication indicative of whether or not said data connection has experienced instability during said shorter period, and a second indication indicative of a measure of user activity on said data connection during said shorter period;

monitoring the performance of the data connection in dependence on said connection data;

selecting one of said stored profiles to be applied to the data connection in dependence on the results of said monitoring; and applying the selected profile to the data connection;

wherein monitoring the performance of the data connection includes identifying, from the shorter periods within said monitoring period, those shorter periods in respect of which the second indication is indicative of user activity above a predetermined level having been observed on said data connection during said shorter period, and determining or estimating, from first indications obtained in respect of those shorter periods so-identified, a measure of the number of times that the data connection has experienced instability during those shorter periods so-identified within said monitoring period, discounting first indications obtained in respect of shorter periods in respect of which the second indications are indicative of user activity above said predetermined level not having been observed, when selecting a profile to apply to the data connection.

2. A method according to claim 1 wherein the first indication in respect of a particular data connection and a particular shorter period comprises an indication indicative of whether or not said data connection has re-synchronised during said shorter period.

3. A method according to claim 1 wherein the first indication in respect of a particular data connection and a particular shorter period comprises an indication indicative of the number of times said data connection has re-synchronised during said shorter period.

4. A method according to claim 1 wherein the first indication in respect of a particular data connection and a particular shorter period comprises an indication indicative of whether or not errors have occurred in data traversing said data connection during said shorter period.

5. A method according to claim 1 wherein the first indication in respect of a particular data connection and a particular shorter period comprises an indication indicative of the number of errors that have occurred in data traversing said data connection during said shorter period.

6. A method according to claim 1 wherein the second indication in respect of a particular data connection and a particular shorter period comprises an indication indicative of one or more of:
   a measure of the amount of user data flowing on said data connection from one or more end-user devices during said shorter period;
   a measure of the amount of user data flowing on said data connection towards one or more end-user devices during said shorter period;
   a measure of the combined amount of user data flowing on said data connection either to or from one or more end-user devices during said shorter period.

7. A method according to claim 1 wherein the second indication in respect of a particular data connection and a particular shorter period comprises a power-mode indication indicative of whether or not the data connection in question was in a low-power mode or not during the shorter period in question, and wherein the second indication is taken as being indicative of user activity not having been observed above said predetermined level in the event that said power-mode indication indicates that the data connection in question was in a low-power mode during the shorter period in question.

8. A method according to claim 1 wherein the length of said monitoring period is of the order of 12, 24 or 48 hours.

9. A method according to claim 1 wherein the length of said shorter periods is of the order of 5, 10, 15 or 30 minutes.

10. A method according to claim 1 wherein the data connections are digital subscriber lines including remote and central transceiver units connected over a copper pair and operating in accordance with one or more of the various xDSL standards agreed by the International Telecommunication Union.

11. A method according to claim 1 wherein the aggregation transceiver device is a Digital Subscriber Line Access Multiplexer comprising a plurality of central transceiver units operating in accordance with an xDSL standard.

12. A method according to claim 1 wherein the profiles are stored within a device controlled by an operator of the access network.

13. A management device for use in an access network including a plurality of data connections between end-user devices and an aggregation transceiver device where the data connections are aggregated for onward connection through the access network, the access network storing in association with each data connection a profile which specifies a set of values for one or more parameters associated with the respective data connection, the device comprising:

a receiver for obtaining, in respect of each data connection, connection data relating to a monitoring period, said monitoring period comprising a plurality of shorter periods, said connection data comprising, for each of said shorter periods, a first indication indicative of whether or not said data connection has experienced instability during said shorter period, and a second indication indicative of a measure of user activity on said data connection during said shorter period;

a processor unit for selecting, in respect of each data connection, a profile to be applied to that data connection in dependence on the connection data obtained in respect of that data connection; and a requester for requesting an Operational Support System of the access network to apply, to respective data connections, the profile selected in respect of said data connections;

wherein the processor unit is further operable to identify, from the shorter periods within said monitoring period, those shorter periods in respect of which the second indication is indicative of user activity above a predetermined level having been observed on said data connection during said shorter period, and to determine or estimate, from first indications obtained in respect of those shorter periods so-identified, a measure of the number of times that the data connection has experienced instability during those shorter periods so-identified within said monitoring period, discounting first indications obtained in respect of shorter periods in respect of which the second indications are indicative of user activity above said predetermined level not having been observed, when selecting a profile to apply to the data connection.

14. An access network including a management device according to claim 13.

15. Non-transitory computer-readable storage medium carrying a computer program or suite of computer programs for causing the method of claim 1 to be carried out during execution of the program or programs.

* * * * *